(12) United States Patent
Chen

(10) Patent No.: US 9,857,606 B2
(45) Date of Patent: Jan. 2, 2018

(54) SPECTACLE STRUCTURE WITH TRANSFORMABLE FRAMES

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 119 days.

(21) Appl. No.: 15/156,608

(22) Filed: May 17, 2016

(65) Prior Publication Data

US 2017/0336650 A1 Nov. 23, 2017

(51) Int. Cl.
*G02C 5/00* (2006.01)
*G02C 9/00* (2006.01)

(52) U.S. Cl.
CPC .............. *G02C 5/00* (2013.01); *G02C 5/001* (2013.01); *G02C 9/00* (2013.01); *G02C 2200/04* (2013.01); *G02C 2200/08* (2013.01)

(58) Field of Classification Search
CPC . G02C 5/00; G02C 5/001; G02C 9/00; G02C 2200/04; G02C 2200/08; G02C 5/006; G02C 9/02; G02C 9/04
USPC .................... 351/107, 116, 90, 103
See application file for complete search history.

(56) References Cited

U.S. PATENT DOCUMENTS

| 5,098,180 A * | 3/1992 | Tobey ...................... G02C 1/08 351/85 |
| 5,592,242 A * | 1/1997 | Ooie ........................ G02C 1/02 351/105 |
| 2014/0300854 A1* | 10/2014 | Fox .......................... G02C 1/08 351/47 |
| 2014/0340627 A1* | 11/2014 | Li ........................... G02C 7/086 351/57 |
| 2015/0103304 A1* | 4/2015 | Darcy ...................... G02C 1/06 351/52 |

* cited by examiner

*Primary Examiner* — Jordan Schwartz
(74) *Attorney, Agent, or Firm* — Rosenberg, Klein & Lee

(57) ABSTRACT

A spectacle structure with transformable frames is disclosed. In the spectacle structure, an upper frame and a lower frame have corresponding lens assembling parts, as well as corresponding latched holes and latches to combine the upper frame and the lower frame to one spectacle frame. When the upper frame and the lower frame are going to be separated, push resistant blocks of the upper frame can be pushed to move the latches away from the latched position. Accordingly, the upper frame and the lower frame can be separated or assembled to form half-rimmed or full-rimmed spectacles according to the user's needs.

4 Claims, 4 Drawing Sheets

SPECTACLE STRUCTURE WITH TRANSFORMABLE FRAMES

BACKGROUND

Field of Invention

The disclosure relates to a spectacle structure with transformable frames. More particularly, the disclosure relates to assembling or disassembling an upper frame and a lower frame of the spectacle structure with transformable frames to actively transform between a half-rimmed spectacles and a full-rimmed spectacles.

Description of Related Art

According to the uses and functions, spectacles can be divided into optical spectacles, sunglasses, sport spectacles, and safety spectacles. The designs for various kinds of spectacles are different. For example, full-rimmed spectacles can completely encapsulate the peripheral of the lenses to provide safer protection to the lenses, and thus is usually used in optical spectacles. Half-rimmed spectacles have a lighter weight than full-rimmed spectacles. Therefore, sunglasses and sport spectacles usually use half-rimmed spectacles to increase the light and convenient feelings of the outdoor activities and constructions.

Since the preferences and needs are different for different peoples, the spectacles stores usually need to prepare various kinds of full-rimmed and half-rimmed spectacles for customers. Hence, the operation cost of the spectacles stores is increased. Furthermore, in addition to the basic functions of protection and vision correction, the spectacles also become an important accessory for the modeling and dressing. For consumers liking new and changing, they often choose various kinds of half-rimmed and full-rimmed spectacle frames to go with their modeling and dressing in various occasions. Therefore, the consumers used to wear spectacles may have optical spectacles and sunglasses. The consumers using spectacles to go with their modeling and dressing may additionally have full-rimmed spectacles and half-rimmed spectacles. Purchasing so many spectacles is not only an economic burden but also a storage trouble. Moreover, the unused spectacles are idle to produce waste of material resources.

Accordingly, in view of the available spectacle frames limited by either the half-rimmed or the full-rimmed design as well as causing the buying and selling burden of the consumers and the spectacles stores, the inventors develop this invention by the many-year manufacturing and design experience and knowledge in the related fields and ingenuity.

SUMMARY

This invention is related to a spectacle structure with transformable frames. A main aspect of this invention is to provide a spectacle structure with transformable frames that can be transformed between a half-rimmed spectacles and a full-rimmed spectacles.

In light of the forgoing, the spectacle structure with transformable frames comprising:

an upper frame, comprising an upper lens assembling part having a lower-half opening; two latched holes respectively disposed on two bottom sides of the upper frame; two first pivot holes respectively disposed next to the two latched holes; two assembling slots respectively disposed on two rear sides of the upper frame and respectively communicated to the latched holes and the first pivot holes; two push resistant blocks respectively received by the assembling slots on two sides of the upper frame; two second pivot holes respectively located on one side of the push resistant blocks and respectively corresponding to the first pivot holes of the upper frame; two unlocking sides respectively located on one side opposite to the second pivot holes extending to the latched holes; and two pivot axes respectively having one terminal penetrating the first pivot holes on two sides of the upper frame and pivotally connected to the second pivot holes of the push resistant blocks; as well as a lower frame, comprising at least a lower lens assembling parts having an upper-half opening to be assembled with the upper lens assembling part of the upper frame to form an intact lens assembling part; and two latches respectively disposed on two upper sides of the lower frame and respectively having a protruding flange on the latches, wherein the protruding flanges are respectively latched to jointing slot walls between the assembling slots and the latched holes, and the unblocking sides of the push resistant blocks are respectively against the protruding flanges.

In the spectacle structure with transformable frames above, rear surfaces of the unlocking sides of the push resistant blocks respectively have protruding parts exposed by the assembling slots.

In the spectacle structure with transformable frames above, the upper frame further comprises two temple pivot slots respectively disposed on two sides of the rear surface of the upper frame and above the assembling slots, wherein the first pivot holes of the upper frame respectively penetrate to the temple pivot slots, one terminals of the pivot axes penetrate the second pivot holes of the push resistant block to penetrate to the temple pivot slots; and two locking holes respectively disposed on the upper slot walls of the temple pivot slots and corresponding to the first pivot holes, such that one terminals of the pivot axes can lock and connect the locking holes.

Accordingly, the spectacle structure with transformable frames can actively change the forms of half-rimmed spectacles and full-rimmed spectacles. Therefore, only a spectacle frame is needed to buy for the consumers to change the forms between half-rimmed spectacles and full-rimmed spectacles, and the economic cost for buying spectacle frames can be saved. For spectacle stores, they don't need to place the full-rimmed spectacles and half-rimmed spectacles on the shelf to provide choices for the consumers, and the operating costs can thus be decreased. Moreover, the upper frame and the lower frame can present different color and patterns to increase the trendy and fashionable feelings to meet the needs of the innovating and changing consumer market, and the competitiveness of the foregoing spectacle structure can be further increased.

DETAILED DESCRIPTION

To more completely and clearly illustrate the technical means and effects of this invention, the detailed descriptions are set forth below. Please refer to the disclosed figures and the reference numbers.

Figure 1:
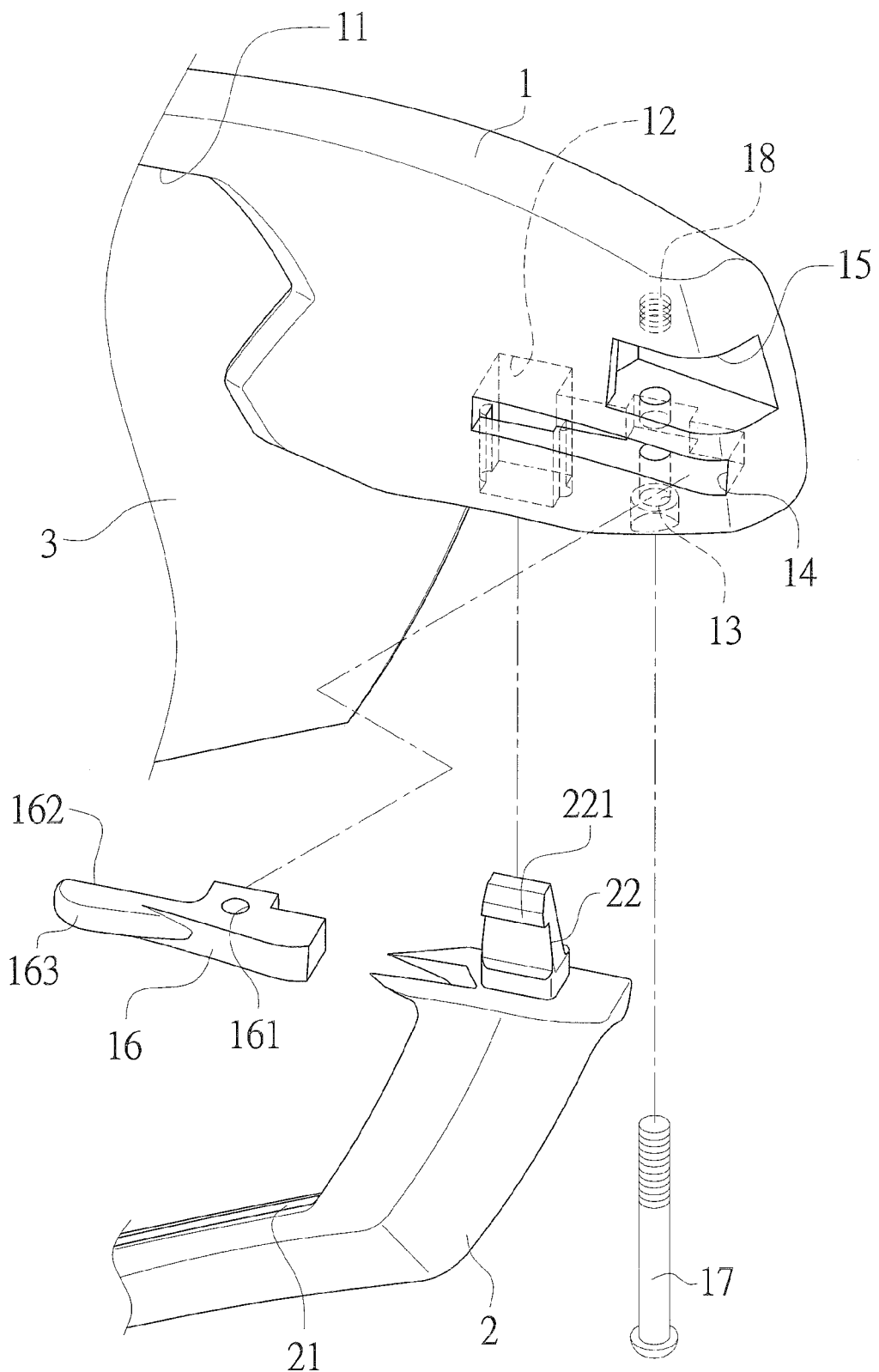
FIG. 1 is a perspective exploded diagram of this invention.
Figure 2:
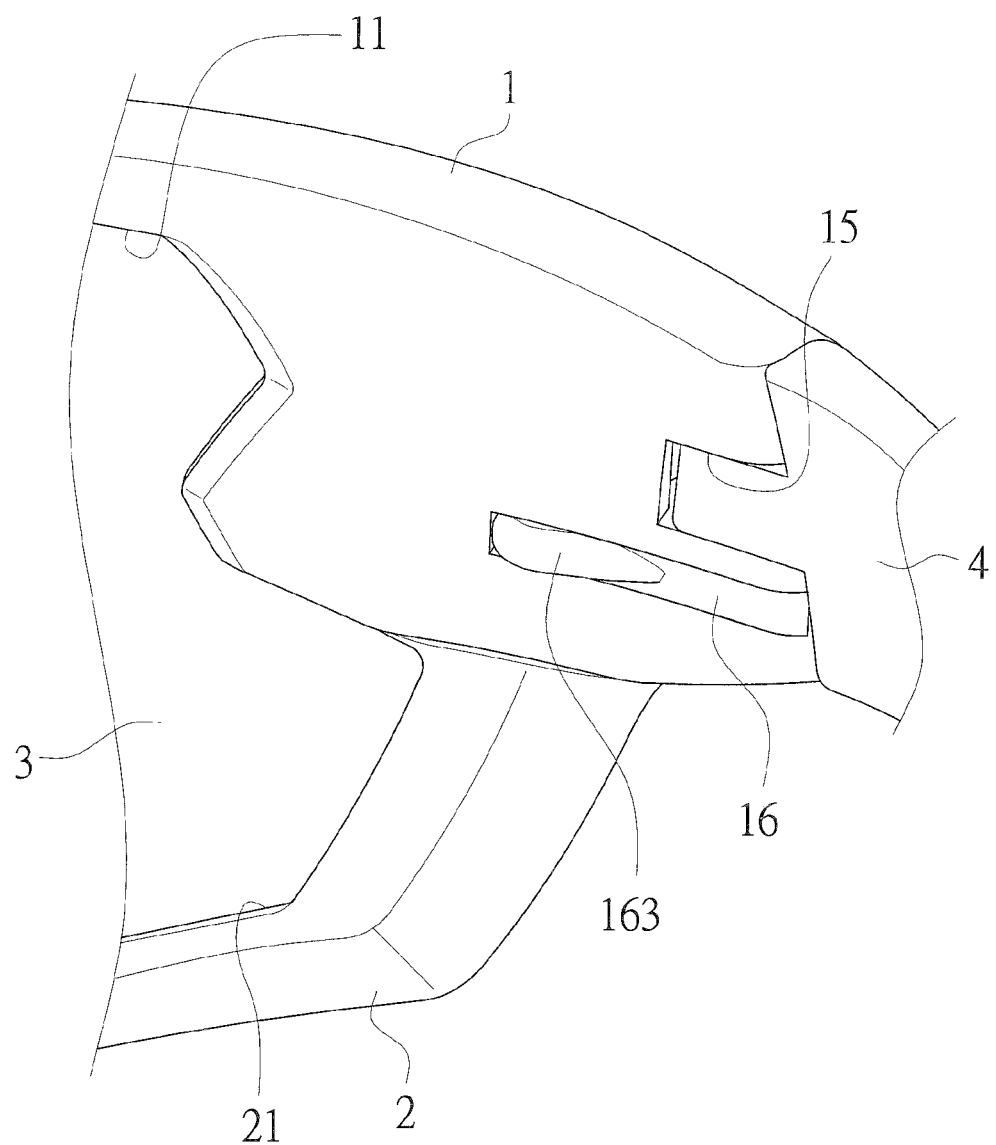
FIG. 2 is a perspective diagram of this invention.
Figure 3:
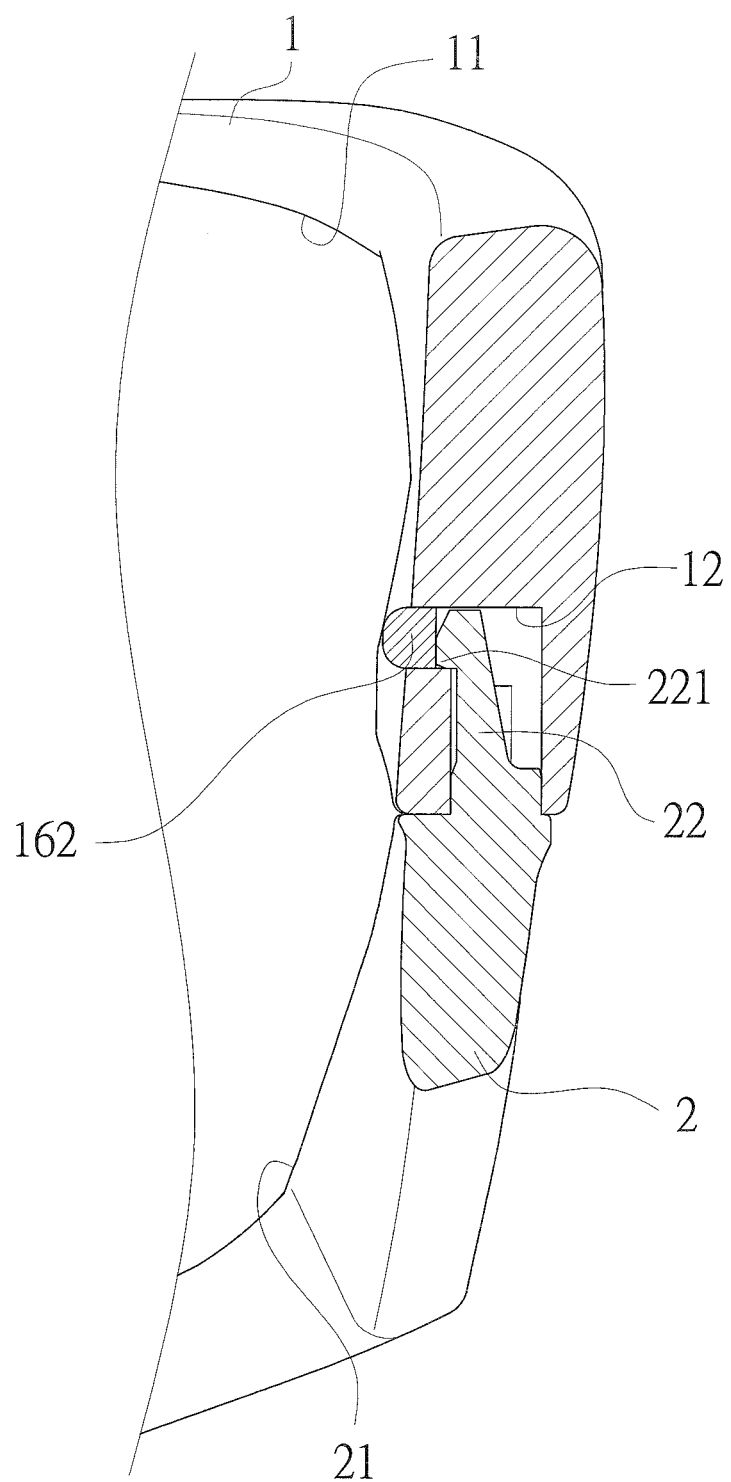
FIG. 3 is a cross-sectional diagram of this invention.

First, please refer to FIGS. 1-3. FIGS. 1-3 show a spectacle structure with transformable frames. The spectacle structure mainly comprises an upper frame 1 and a lower frame 2.

The upper frame 1 has an upper lens assembling part 11 having an opening on the lower half thereof. Two latched holes 12 are respectively disposed on two bottom sides of the upper frame 1, and two first pivot holes 13 are respectively disposed next to the two latched holes 12. Two assembling slots 14 are respectively disposed on two rear sides of the upper frame 1, and the assembling slots 14 are respectively communicated to the latched holes 12 and the first pivot holes 13. Two temple pivot slots 15 are disposed on two sides of the rear surface of the upper frame 1, and the temple pivot slots 15 are located above the assembling slots 14. Two push resistant blocks 16 are disposed on where the first pivot holes 13 penetrate to reach the temple pivot slots 15. The two push resistant blocks 16 are correspondingly received by the two assembling slots 14 located on two sides of the upper frame 1. Two second pivot holes 161 are respectively disposed on one side of the push resistant blocks 16 and correspond to the first pivot holes 13 of the upper frame 1. The resistant push blocks 16 each has a portion that extends to a periphery to form an unlocking side 162. The rear side of the unlocking side 162 of the push resistant block 16 has a protruding part 163 slightly protruding from the assembling slots 14. One terminal of two pivot axes 17 respectively penetrate the first pivot holes 13 and the temple pivot slots 15 of the upper frame 1 to connect a locking hole 18 corresponding with the first pivot hole 13 and located on upper slot walls of the temple pivot slots 15. The pivot axes 17 are pivotally connected to the second pivot holes 161 of the push resistant block 16.

The lower frame 2 has a lower lens assembling part 21 having an opening on the upper half thereof to assemble with the upper lens assembling part 12 of the upper frame 1 and form an intact lens assembling part. Two latches 22 are disposed on two top sides of the lower frame 2. The latches 22 have protruding flanges 221 on the upper side of the latches 22, and the protruding flanges 221 are against the slot walls at the jointing places between the assembling slots 14 and the latched holes 12. The unlocking sides 162 of the push resistant blocks 16 are against the protruding flanges 221.

Accordingly, when these parts above are assembled, the push resistant blocks 16 are respectively received by the assembling slots 14 on two sides of the upper frame 1 and the second pivot holes 161 of the push resistant blocks 16 are corresponded to the first pivot holes 13 at the bottom edges of the upper frame 1. Next, one terminals of the two pivot axes 17 penetrate the first pivot holes 13 on two sides of the upper frame 1 and pass the second pivot holes 161 of the push resistant blocks 16. Subsequently, one terminals of two temples 4 are disposed in the temple pivot slots 15 on two sides of the upper frame 1. Then, the terminals of the pivot axes 17 penetrate the temple pivot slots 15, and pass the pivot holes disposed on the terminals of the temples 4 to lock and connect the locking holes 18 of the upper slot walls of the temple pivot slots 15. Accordingly, the push resistant blocks 16 and the temples 4 are pivotally connected to the upper frame 1. Next, lenses 3 are assembled on the upper lens assembling parts 11. At this time, the bottom edges of the lenses 3 are exposed by the lower-half opening of the assembling parts 12 of the upper frame 1 to form a half-rimmed spectacles. The light-weight design of the half-rimmed spectacles can be used for outdoor activities and constructions to decrease the spectacles' weight on the nose bridge and ears of the user to increase the lightweight comfort of wearing glasses. In addition, the half-rimmed spectacles present the appearance of neat and cool feeling to enhance the user's modeling and dressing to have trendy and fashionable feelings.

Moreover, when the user wants to increase the stability and safety of the assembled lens 3, the lower frame 2 can be installed on the upper frame 1. In the assembling, the latches 22 on two upper sides of the lower frame 2 are inserted into the latched holes 12 on two bottom sides of the upper frame 1. The protruding flanges 221 on upper terminal of the latches 22 penetrate to the terminals of the latched holes 12 and are latched on the slot walls at jointing places between the assembling slots 14 and the latched holes 12 to combine and fix the lower frame 2 and the upper frame 1. Accordingly, the bottom edges of the lenses 3 exposed by the upper lens assembling part 11 of the upper frame 1 can be correspondingly assembled on the lower lens assembling part 21 of the lower frame 2 to form a full-rimmed spectacles. The lenses 3 are held by the upper lens assembling part 11 of the upper frame 1 and the lower lens assembling part 21 of the lower frame 2, and the stability and the safety of the assembled lenses 3 can be increased to indeed prevent the lenses 3 from accidentally shedding. Moreover, the full-rimmed spectacles can provide rules and steady feelings to the user.

Figure 4:
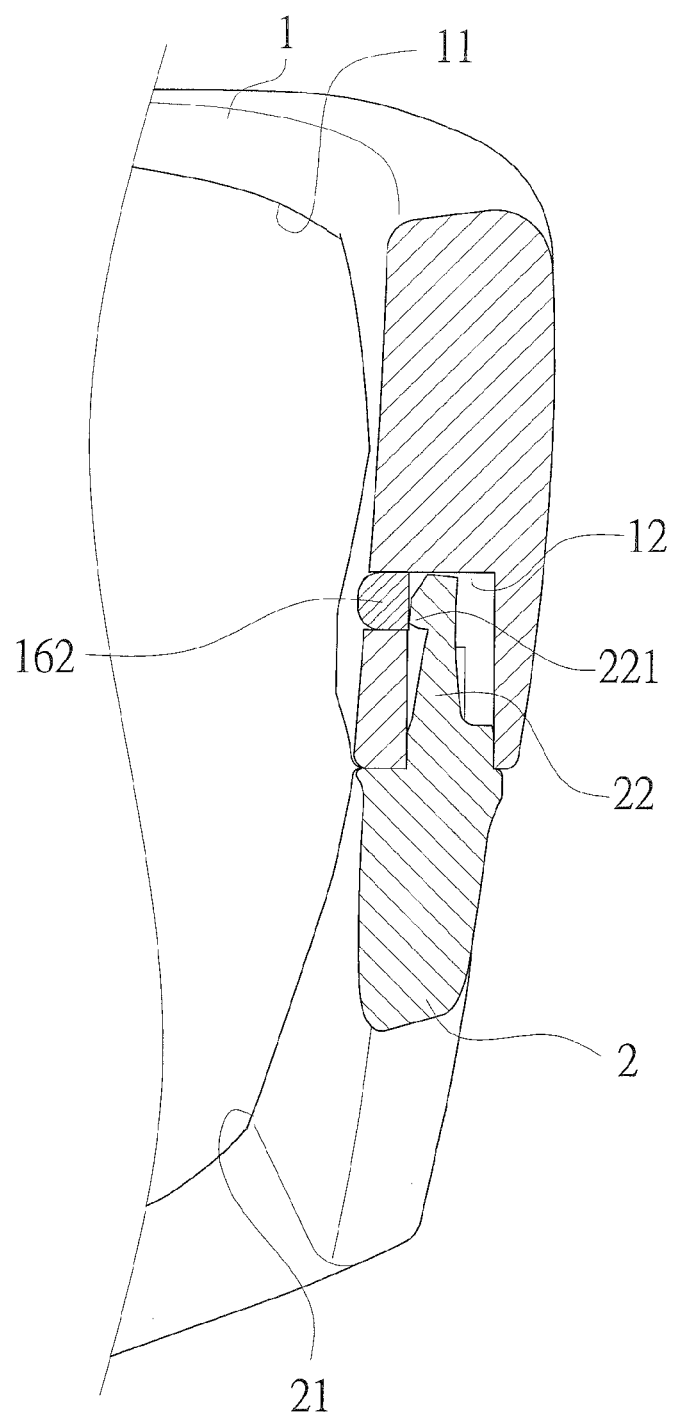
FIG. 4 is a using diagram of this invention.

Please also refer to FIG. 4. When a user wants to detach the lower frame 2 from the upper frame 1, the user can push the protruding parts 163, exposed by the assembling slots 14, of the rear surface of the unlocking sides 162 of the push resistant blocks 16 to remove the protruding flange 221 of the latches 22, being in front of the unlocking sides 162 of the push resistant block 16, from the latched position of the jointing slot wall between the assembling slots 14 and the latched hole 12, such that the latches 22 of the lower frame 2 are released from the latched hole 12 of the upper frame 1. At this time, the latches 22 of the lower frame 2 can be drawn out from the latched hole 12 of the upper frame 1 to separate the lower frame 2 and the upper frame 1. Accordingly, the design of the spectacles structure can transform the spectacle frame structure. A user can transform the spectacle structure between the half-rimmed and the full-rimmed forms according to his/her needs. Moreover, the upper frame 1 and the lower frame 2 can present different colors and patterns to increase the trendy and fashionable feelings. For the consumers liking new and changing, they don't need to buy a full-rimmed spectacles and a half-rimmed spectacles as well as install lenses 3 respectively in the full-rimmed spectacles and the half-rimmed spectacles to save the cost of buying spectacles. For the spectacle shops, they don't need to place the full-rimmed spectacles and half-rimmed spectacles on the shelf to provide the choices for the consumers, and thus the operating costs can be decreased.

The forgoing embodiments and diagrams are not used to limit the implementation aspects of the spectacles structure with transformable frames. The variations and modifications made by persons skilled in the art should be viewed without departing from the scope of the spectacles with transformable frames in this invention.

What is claimed is:

1. A spectacle structure with transformable frames, comprising:
   an upper frame, comprising:
      an upper lens assembling part having a lower-half opening;
      two latched holes respectively disposed on two bottom sides of the upper frame;

two first pivot holes respectively disposed next to the two latched holes;

two assembling slots respectively disposed on two rear sides of the upper frame and respectively communicated to the latched holes and the first pivot holes;

two push resistant blocks respectively received by the assembling slots, the two push resistant blocks on two sides of the upper frame;

two second pivot holes respectively located within the push resistant blocks and respectively corresponding to the first pivot holes of the upper frame;

two unlocking sides respectively located on peripheral portions of the push resistant blocks and located at positions corresponding to the latched holes; and two pivot axes respectively having one terminal penetrating the first pivot holes on two sides of the upper frame and the terminals pivotally connected to the second pivot holes of the push resistant blocks; as well as a lower frame, comprising:

at least a lower lens assembling part having an upper-half opening to be assembled with the upper lens assembling part of the upper frame to form an intact lens assembling part; and two latches respectively disposed on two upper sides of the lower frame and respectively having a protruding flange on the latches, wherein the protruding flanges are respectively latched to jointing slot walls between the assembling slots and the latched holes, and the unlocking sides of the push resistant blocks are respectively against the protruding flanges.

2. The spectacle structure with transformable frames of claim 1, wherein rear surfaces of the unlocking sides of the push resistant blocks respectively have protruding parts exposed by the assembling slots.

3. The spectacle structure with transformable frames of claim 2, wherein the upper frame further comprises:

two temple pivot slots respectively disposed on two sides of the rear surface of the upper frame and above the assembling slots, wherein the first pivot holes of the upper frame respectively penetrate to the temple pivot slots and the terminals of the pivot axes penetrate the second pivot holes of the push resistant blocks to penetrate to the temple pivot slots; and two locking holes respectively disposed on the upper slot walls of the temple pivot slots and corresponding to the first pivot holes, such that the terminals of the pivot axes can lock and connect the locking holes.

4. The spectacle structure with transformable frames of claim 1, wherein the upper frame further comprises:

two temple pivot slots respectively disposed on two sides of the rear surface of the upper frame and above the assembling slots, wherein the first pivot holes of the upper frame respectively penetrate to the temple pivot slots, the terminals of the pivot axes penetrate the second pivot holes of the push resistant block to penetrate to the temple pivot slots; and two locking holes respectively disposed on the upper slot walls of the temple pivot slots and corresponding to the first pivot holes, such that the terminals of the pivot axes can lock and connect the locking holes.

\* \* \* \* \*